US009619090B2

(12) United States Patent
Galambos et al.

(10) Patent No.: US 9,619,090 B2
(45) Date of Patent: Apr. 11, 2017

(54) FINGER TOUCH SENSING WITH A DIGITIZER SYSTEM

(71) Applicant: Microsoft Technology Licensing, LLC, Redmond, WA (US)

(72) Inventors: Tiberiu Carol Galambos, Binyamina (IL); Amir Zyskind, Natania (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 157 days.

(21) Appl. No.: 14/445,257

(22) Filed: Jul. 29, 2014

(65) Prior Publication Data

US 2015/0029151 A1 Jan. 29, 2015

Related U.S. Application Data

(60) Provisional application No. 61/859,316, filed on Jul. 29, 2013.

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01); *G06F 2203/04104* (2013.01)

(58) Field of Classification Search
CPC ................................. G06F 3/044; G06F 3/041
See application file for complete search history.

(56) References Cited

U.S. PATENT DOCUMENTS

| 7,843,439 | B2 | 11/2010 | Perski et al. |
| 7,902,840 | B2 | 3/2011 | Zachut et al. |
| 8,338,724 | B2 | 12/2012 | Reynolds |
| 2012/0056841 | A1* | 3/2012 | Krenik .................... G06F 3/044 345/174 |

* cited by examiner

*Primary Examiner* — Michael Faragalla
*Assistant Examiner* — Chayce Bibbee
(74) *Attorney, Agent, or Firm* — Miia Kati Janette Sula; Sergey Lamansky; Micky Minhas (57) ABSTRACT

A method for multi-touch detection on a grid based capacitive sensor includes transmitting consecutively a first and then a second sequence of a Golay pair of sequences on a first driver line of a grid based capacitive sensor and transmitting the first and then the second sequence of a Golay pair of sequences on a second driver line, at a predefined delay with respect to transmission on the first driver line. Output on a receiver line of the grid based capacitive sensor is sampled and output originating from the first driver line is separated from output originating from the second driver line. The presence of an input object is detected responsive to the output as separated.

17 Claims, 9 Drawing Sheets

FINGER TOUCH SENSING WITH A DIGITIZER SYSTEM

RELATED APPLICATION

This application claims the benefit of priority under 35 USC §119(e) of U.S. Provisional Patent Application No. 61/859,316 filed Jul. 29, 2013, the contents of which are incorporated herein by reference in their entirety.

FIELD AND BACKGROUND OF THE INVENTION

The present invention, in some embodiments thereof, relates to touch detection with a capacitive based digitizer system and, more particularly, but not exclusively, to a method for multi-touch detection with a grid based capacitive digitizer sensor and/or touch screen.

Digitizer systems that include capacitive sensors are commonly used as input devices for a variety of Human Interface Devices (HIDs) and for a variety of different applications. A touch-screen is one type of digitizer system that is integrated with a Flat Panel Display (FPD). Touch-screens are often used for operating portable devices, such as laptop computers, tablet computers, MP3 players, smart phones and other devices. Touch screens offer a more intuitive and versatile manner for interacting with an electronic product as compared to other known input devices. Touch screens can be used for example to select virtual buttons displayed on the screen, to manipulate size and position of displayed objects, to enter data with a virtual keyboard, virtual number pad and/or by handwritten input, to open a document or application, to scroll within a window, to draw and/or to play games. Some touch screens support multi-touch operations where multiple simultaneous touches can be used to provide input. Multi-touch operations can be used to perform more advance operations with a touch screen.

Many touch screens use a grid based capacitive sensor and/or a mutual capacitive sensor for touch detection. Multi-touch is typically supported by sequentially triggering each row or column in the grid and while detecting the electrical effect of the triggering on the crossing rows or columns.

U.S. Pat. No. 7,843,439, entitled "Touch Detection for a Digitizer" assigned to N-Trig Ltd., the contents of which is incorporated herein by reference, describes a digitizing system including a transparent digitizer sensor overlaid on a flat panel display (FPD). The transparent digitizing sensor includes a matrix of vertical and horizontal conductive lines for sensing location of one or more of a stylus and/or a finger. Input to the digitizer sensor includes one or more of electromagnetic (EM) transmission from the stylus touching the sensing surface and capacitive coupling due to a conductive object such as a finger touching the screen. Location of a finger is detected by triggering one conductive line at a time along one axis of the grid and detecting output in response to each signal applied from a plurality of conductive lines along the other axis. Based on this method, the digitizing system is capable of detecting position of simultaneous occurrences of multiple styluses and/or multiple finger touches.

U.S. Pat. No. 7,902,840 entitled "Apparatus for object information detection and methods of using same", assigned to N-trig, the contents of which are hereby incorporated by reference describes a method for detecting an object on a sensor sensitive to capacitive coupling. The method includes simultaneously transmitting signals on at least two electrodes of the sensor with non-mutually interfering (orthogonal) frequencies, and sampling output from at least one other electrode crossing the at least two electrodes. The sampled signal is responsive to capacitive coupling formed between each of the at least two electrodes and the at least one other crossing electrode. One or more objects positioned over the sensor can be detected from the sampled signals. It is described that the simultaneous transmitting can be used to speed up report rate.

U.S. Pat. No. 8,338,724 entitled "Methods and Systems for detecting a position-based attribute of an object using digital codes", the contents of which are hereby incorporated by reference describes a code division multiplexing technique that can be applied with a position sensor such as a touchpad to improve noise immunity and/or to provide performance enhancements. It is described that code division multiplexing can be used to create two or more distinct modulation signals that are simultaneously applied to transmitter electrodes within the sensor, thereby increasing the effective power of the applied signals. The distinct modulation signals are described as digitally encoded signals that are orthogonal to each other. Corresponding output from receiver electrodes are demodulated to identify position of an object anywhere on the position sensor.

SUMMARY OF THE INVENTION

According to some embodiments of the present invention, there is provided an improved method for interrogating a grid based capacitive sensor for multi-touch detection. According to some embodiments of the present invention, the method includes simultaneously triggering a plurality of transmitter and/or driver lines of the sensor with signals including a digital sequence and separating the signals on the receiver end. In some exemplary embodiments, drive signal includes a carrier signal modulated with the digital sequence. In some exemplary embodiments, more than one carrier signal is used in combination with the digital sequence for interrogating the grid based capacitive sensor for multi-touch detection.

According to an aspect of some embodiments of the present invention, there is provided a method for multi-touch detection on a grid based capacitive sensor, the method comprising: transmitting consecutively a first and then a second sequence of a Golay pair of sequences on a first driver line of a grid based capacitive sensor; transmitting the first and then the second sequence of a Golay pair of sequences on a second driver line, at a predefined delay with respect to transmission on the first driver line; sampling output on a receiver line of the grid based capacitive sensor; separating output originating from the first driver line with output originating from the second driver line; and detecting presence of an input object responsive to the output as separated.

Optionally, the Golay pair of sequences is a pair of bipolar sequences.

Optionally, the Golay pair of sequences transmitted on each of the first and second drive lines are encoded on a carrier signal.

Optionally, the Golay pair of sequences is encoded as a sequence of phase inversions of the carrier signal.

Optionally, the first sequence transmitted on the first driver line is encoded on a first carrier signal and wherein the second sequence transmitted on the second driver line is encoded on a second carrier signal that is orthogonal to the first carrier signal.

Optionally, the first and second carrier signals are orthogonal in frequency.

Optionally, the method includes using frequency domain multiplexing for transmitting the second sequence on the first driver line concurrently with transmitting the first sequence on the second driver line.

Optionally, the method includes transmitting consecutively the first and then the second sequence of the Golay pair of sequences on a third driver line of the grid based capacitive sensor and in phase with transmission on the first driver line, wherein the Golay pair of sequences transmitted on the first driver line is encoded on a first carrier signal and wherein the Golay pair of sequences transmitted on the third driver line is encoded on a second carrier signal that is orthogonal to the first carrier signal.

Optionally, the output originating from the first driver line is separated with output originating from the second driver line using a single correlator.

Optionally, the method includes cross correlating the output on the receiver line with each of the first and second sequences of the Golay pair of sequences and summing results of the cross correlation with the first sequence with results of the cross correlation of the second sequence.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS
OF THE INVENTION

The present invention, in some embodiments thereof, relates to touch detection with a capacitive based digitizer system and, more particularly, but not exclusively, to a method for multi-touch detection with a grid based capacitive digitizer sensor and/or touch screen.

According to some embodiments of the present invention, a pair of complementary digital sequences is used for interrogating a grid based capacitive sensor. According to some embodiments of the present invention, time domain multiplexing (TDM) is used to simultaneously trigger a plurality of driver lines with the digital sequence. According to some embodiments of the present invention, a Golay pair of sequences is used for triggering driver lines. Golay pairs of sequences are known to have the special property that their out-of-phase aperiodic auto-correlation coefficients sum to zero and their in-phase auto-correlation coefficients sum to a Dirac sequence. For example, a Golay pair of sequences $A_n$ and $B_n$ has the following property:

$$A_n * A_n + B_n * B_n = 2^{n+1} \delta$$

where * represents cross correlation, n represents the number of coefficients in each sequence and $\delta$ is the Dirac sequence. The present inventors have found that the properties of the Golay pair of sequences can be useful for multiplexing triggering and/or drive signals when simultaneously triggering a plurality of driver lines of the digitizer sensor during multi-touch detection.

According to some embodiments of the present invention, TDM is used to separate in time the Dirac sequences resulting from summation of their in-phase auto-correlation coefficients. Typically, the Golay pair of sequences is transmitted on each of the plurality of driver lines with different phase shifts and/or delays, and then cross-correlation and summation of the cross-correlation results is used to separate output obtained from each of the plurality of driver lines. The present inventors have found that due to the special properties of the Golay pair of sequences, each of the driver lines can produce a response in the receiver lines that can be clearly identified. Typically, the response as detected on the receiver line has a shape of a derivative of an impulse due to a high pass filter response of the capacitive sensor. Typically, amplitude of the response is detected and used to identify a presence and position of a finger or capacitive object.

The present inventors have found that using Golay pairs of sequences for simultaneously triggering a plurality of lines for multi-touch detection may have advantages over known methods that require using orthogonal frequencies. One advantage in using Golay pairs of sequences is that since a same sequence is transmitted on each of the driver lines, a single correlator can be used on the receiver lines for separating the output. Typically, when orthogonal frequencies are used, the receiver lines require a dedicated correlator for each orthogonal frequency. Another advantage is the coding gain achieved by triggering with a digital sequence.

According to some embodiments of the present invention, the phase shifts between the Golay pairs of sequences applied on the different driver lines are defined to be longer than the impulse response of the sensor so that the input from each of the driver lines can be separately identified. Optionally, a length of the Golay sequence is defined responsive to a plurality of parameters including the noise environment, size of the grid, desired accuracy and desired refresh rate. Typically, longer sequences improve detection due to coding gain, but at an expense of more computations and increased duration for transmission.

In some exemplary embodiments, the Golay pair of sequences is encoded on a carrier signal, e.g. an alternating signal. Optionally, the carrier signal with a constant frequency is used. Optionally, encoding is performed by using inverse phases, e.g. one of θ and θ+180. Optionally, one of time domain multiplexing or frequency domain multiplexing is used for transmitting the pair of sequences, $A_n$ and $B_n$. The present inventors have found that the dynamic range of the output is significantly more compact when encoding the Golay pairs of sequences with inverse phases since the inverted phases at least partially cancel the transmitted signal. Typically, reduced dynamic range is associated with improved resolution for finger touch detection and improved SNR.

In some exemplary embodiments, multiplexing with Golay pairs of sequences is combined with multiplexing with orthogonal frequencies. Optionally, multiplexing with Golay pairs of sequences is combined with other methods for multiplexing. Optionally, the combination provides for increasing the number of driver lines that can be simultaneously triggered for interrogating a digitizer sensor for multi-touch detection.

Figure 1:
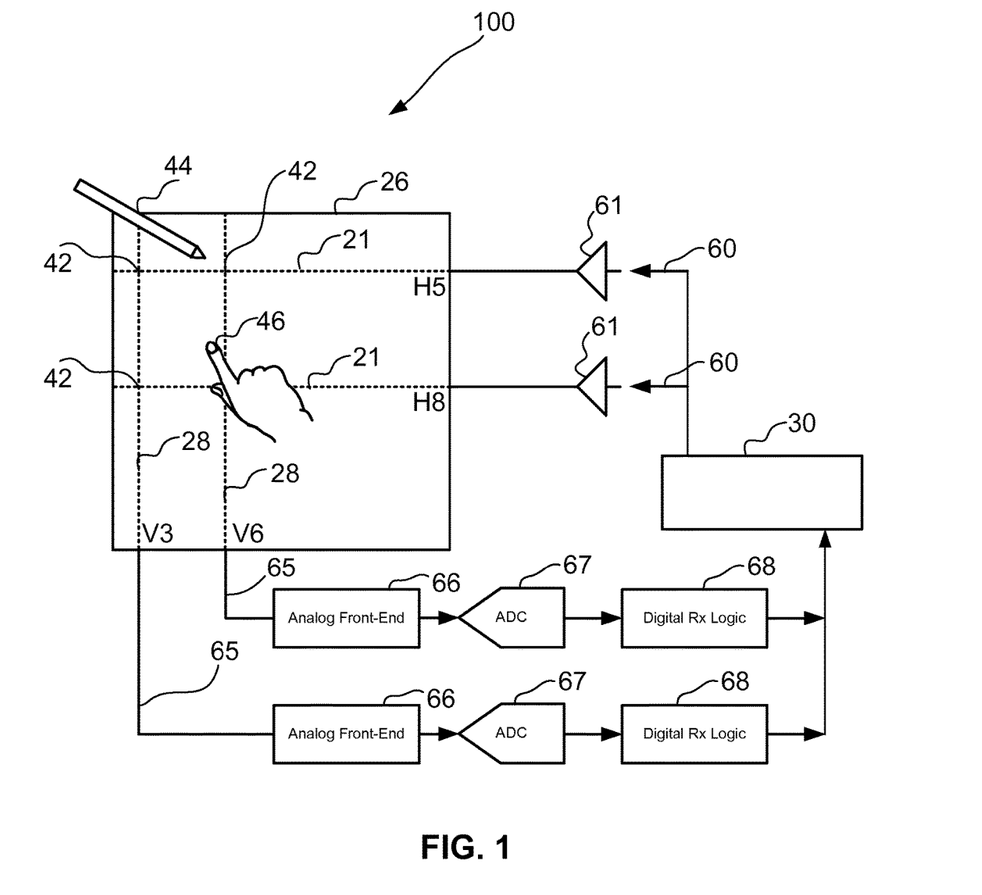
FIG. 1 is a simplified block diagram of an exemplary digitizer system in accordance with some embodiments of the present invention.

For purposes of better understanding some embodiments of the present invention, as illustrated in FIGS. 2-7 of the drawings, reference is first made to the general construction and operation of a digitizer system as shown in FIG. 1. Digitizer system 100 shown in FIG. 1 may be suitable for any computing device that can be operated with stylus and/or fingertip input from a user to the device, e.g. mobile and/or desktop and/or tabletop computing devices that include, for example, FPD screens. Examples of such devices include Tablet PCs, pen enabled lap-top computers, tabletop computers, personal digital assistants (PDAs) or any hand held devices such as palm pilots and mobile phones, or other devices that facilitate electronic gaming.

According to some embodiments of the present invention, digitizer system 100 includes a sensor 26 constructed with patterned arrangement of conductive lines, which is optionally transparent, and which is typically overlaid on a flat panel display. Typically, sensor 26 is a grid based capacitive sensor including a set of horizontal conductive lines 21, e.g. H5 and H8, and a set of vertical conductive lines 28, e.g. V3 and V6 that are capacitively coupled. Typically, capacitive coupling between horizontal conductive lines 21 and vertical conductive lines 28 occur near and/or around junctions 42. It is noted that although sensor 26 typically includes a large set of horizontal and vertical conductive lines, only two horizontal conductive lines 21 and two vertical conductive lines are shown for simplicity purposes. Typically, the parallel conductive lines are spaced at a distance of approximately 2-6.5 mm, e.g. 4 mm apart. The distances typically depend on the size of the FPD and the resolution desired.

Sensor 26 can typically detect and/or track position of one or more styluses 44 and/or fingertips 46 interacting with sensor 26. Optionally, stylus 44 is a signal transmitting stylus and sensor 26 is operative to pick up signals transmitted by stylus 44. In some exemplary embodiments, stylus 44 transmits encoded signals that can be demodulated by digitizer system 100. Optionally, digitizer system 100 can synchronize with transmission of stylus 44. Fingertip 46 interaction with sensor 26 is often detected using a mutual capacitance sensing method. In some exemplary embodiments, a change in capacitance at or near one or more junctions 42 in sensor 26 is detected by triggering one or more horizontal conductive lines 21 or one or more vertical conductive lines 28, e.g. one or more driver lines with input 60 and detecting output 65 crossing by virtue of capacitive coupling to crossing lines, e.g. receiver lines. Typically a fingertip touch with fingertip 46 on the sensor may span 2-8 lines, e.g. 4 conductive lines.

Typically, input 60 is a pulse, sinusoidal and/or AC signal that can be picked up by cross lines due to capacitive coupling between the lines. Typically, the presence of a fingertip 46 decreases the amplitude of the coupled signal received on a receiver line, e.g. decreases the amplitude in reference to base-line amplitude and is thereby detected. Optionally, a finger hovering above the display, i.e. near touch, can also be detected, although the decrease of the signal is generally smaller as compared to the decrease during touch. Optionally, the procedure for detection includes triggering each driver line along one axis of the sensor, one line at a time, while sampling signals on all receiver lines. Optionally, some driver lines of the sensor are simultaneously triggered with different signals, for example signals differing in their frequency, phase, coding or the like. Optionally, the coding is digital coding. This triggering and detecting procedure is typically repeated until all the driver lines have been triggered and interactions in all junctions 42 have been detected. Optionally, all the driver lines are triggered simultaneously and scanning is not required.

Typically, sensor 26 is connected to circuitry for operating sensor 26. Typically, the circuitry produces input 60 that is amplified by amplifiers 61 prior to triggering active lines of sensor 26, e.g. horizontal conductive lines 21. Typically, circuitry associated with the receiver lines includes both analog based circuitry and digital based circuitry. In some exemplary embodiments, each of the receiver lines e.g. vertical lines 28 are connected to an analog front end 66 filters, e.g. to remove irrelevant frequencies, amplifies and/or otherwise process output from sensor 26. Typically, an analog to digital converter (ADC) 67 samples the pre-processed output and then the output is further processed after sampling with digital receiver logic element 68. In some exemplary embodiments, digital receiver logic element 68 includes one or more correlators and/or demodulators for reading and/or demodulating received output. Optionally, correlation and/or demodulation performed at least partially with analog components, e.g. analog front end 66. According to some embodiments of the present invention, output from each of digital receiver logic elements 68 is forwarded to a digital unit 30, e.g. digital IC unit, for further digital processing. Typically, digital unit 30 calculates position and/or tracking information based on input received from a plurality of digital receiver logic elements 68. Optionally, digital receiver logic elements 68 is operative decode and/or demodulate coding input from drive lines 21 and/or from stylus 44. Optionally, output from the digital unit 30 is further processed by a host computer (not shown) or an application running on an associated host computer. Typically host computer is integral to an electronic device. It is appreciated that while analog front-end 66, ADC 67, digital receiver logic element 68 and digital unit 30 are shown as separate elements for clarity purposes, the invention is not limited in this respect and the functionality that each of analog front-end 66, ADC 67, digital receiver logic element 68 and digital unit 30 may be divided between more or less elements and/or units and at least some functionality may be performed by firmware and/or software.

Digitizer system 100 used to detect fingertip and optionally stylus location may be, for example, similar to exemplary digitizer systems described in U.S. Pat. No. 7,843,439, and/or U.S. Pat. No. 7,902,840 each of which are incorporated herein by reference.

Figure 2:
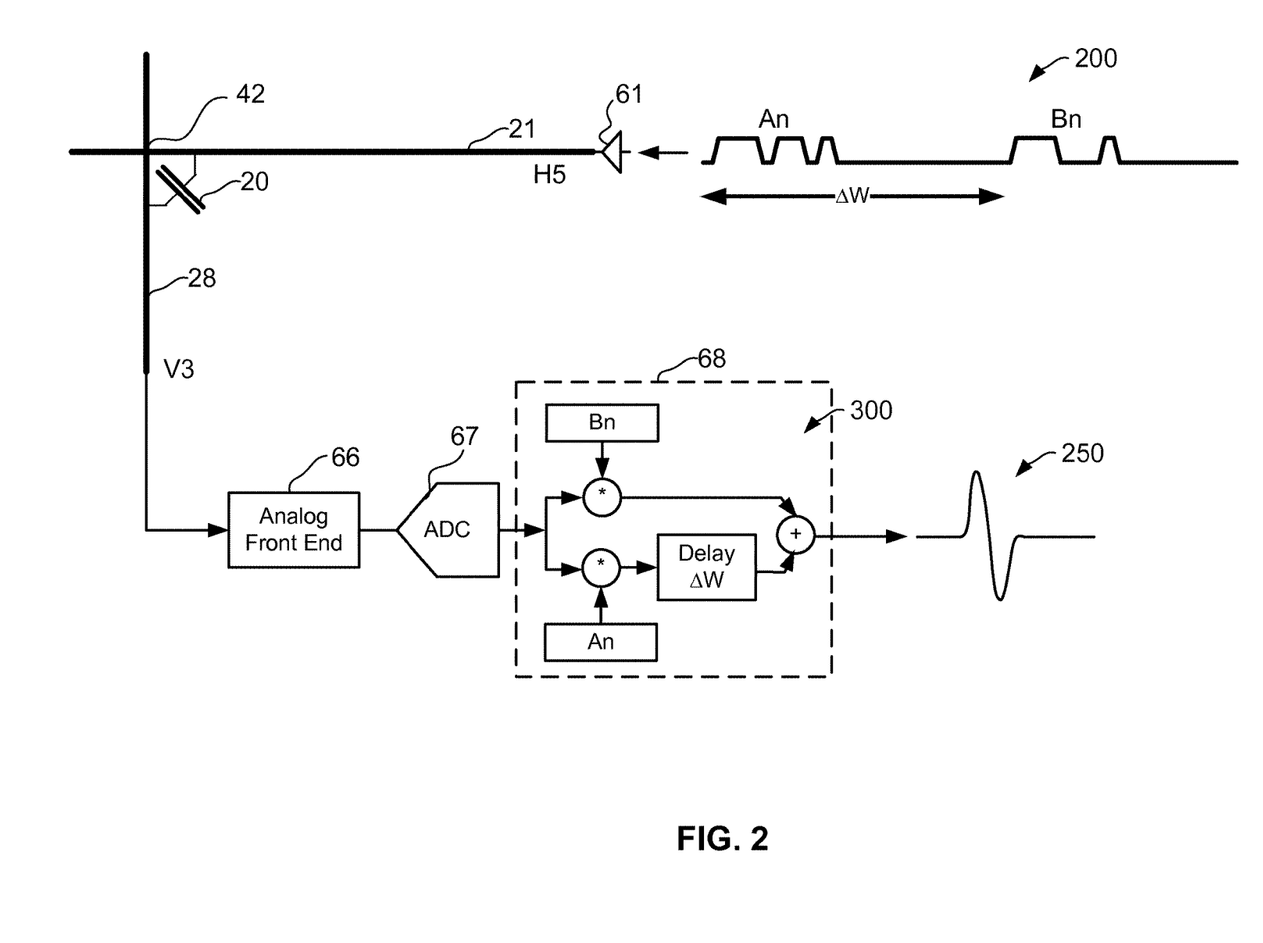
FIG. 2 is a simplified block diagram showing exemplary input to one driver line of a digitizer sensor and corresponding output on one receiver line of the digitizer sensor, in accordance with some embodiments of the present invention.

Reference is now made to FIG. 2 showing a simplified schematic representation of exemplary input to one driver line of a digitizer sensor and processing to obtain a corresponding output on one receiver line of the digitizer sensor in accordance with some embodiments of the present invention. According to some embodiments of the present invention, input 200 to a driver line 21, e.g. horizontal line H5 of digitizer sensor 26 (FIG. 1) is a first Golay sequence, $A_n$ followed by a second Golay sequence $B_n$. Typically, second sequence $B_n$ is transmitted on driver line 21 at a pre-defined delay period of $\Delta W$ relatively to the beginning of $A_n$. Typically, sequences $A_n$ and $B_n$ are binary sequences, e.g. defined by a series of 1's and 0's or bipolar sequences, e.g. defined by a series of +1's and/or −1's. Optionally, using bipolar sequences can be advantageous since the coefficients from the different drive lines can cancel each other out and the signal on the receive line can be maintained at a low amplitude level. Maintaining the signal at low amplitude typically improves the gain that can be achieved and the SNR.

According to some embodiments of the present invention, input 200 is picked up by a crossing line V3, e.g. a receiver line and processed by both analog and digital processing. According to some embodiments of the present invention, after pre-processing with an analog front end 66 and sampling with ADC 67, digital receiver logic 68 including a correlator 300 determines correlation between the sampled signal and each of the Golay sequences $A_n$ and $B_n$, and sums the outputs with a delay imposed on the cross-correlation of the $A_n$ sequence, so that the $A_n$ cross-correlation results are summed with the $B_n$ cross-correlation results. According to some embodiments of the present invention, the summation yields a single response 250 for each pair of Golay sequences transmitted. In some exemplary embodiments, the imposed delay is performed with a single shift register that is defined to store n symbols. This provides an advantage over other known code division multiplexing methods that typically require more than one shift register per receive line and/or a buffer.

Typically, response 250 as detected on the receiver lines is dominated by the junction capacitance 20 and is therefore shaped as a derivative of an impulse function, including a strong positive peak followed by strong negative peak. Typically, response 250 is similar in shape to a response that would be typically received on a receiver line in response to a pulse shaped input provided on a corresponding driver line. Typically, timing of response 250 in relation to timing of input 200 is known. Typically, amplitude of response 250 depends on amplitude of input 200 as well as capacitance 20 between the driver and receiver line. Typically, presence of a finger near junction 42 has the effect of reducing capacitance 20 and amplitude of output 250. Presence of a conductive object typically increases capacitance 20 and amplitude of output 250. According to some embodiments of the present invention, output 250 is determined and used to detect a presence and position of an object, e.g. finger and/or conductive object. Typically, the Golay pair of sequences is transmitted on each driver line at least once per refresh cycle of the digitizer system. Optionally, the transmission the Golay pair of sequences is repeated during each refresh cycle, e.g. the Golay pair of sequences is transmitted twice on each driver line.

Figure 3:
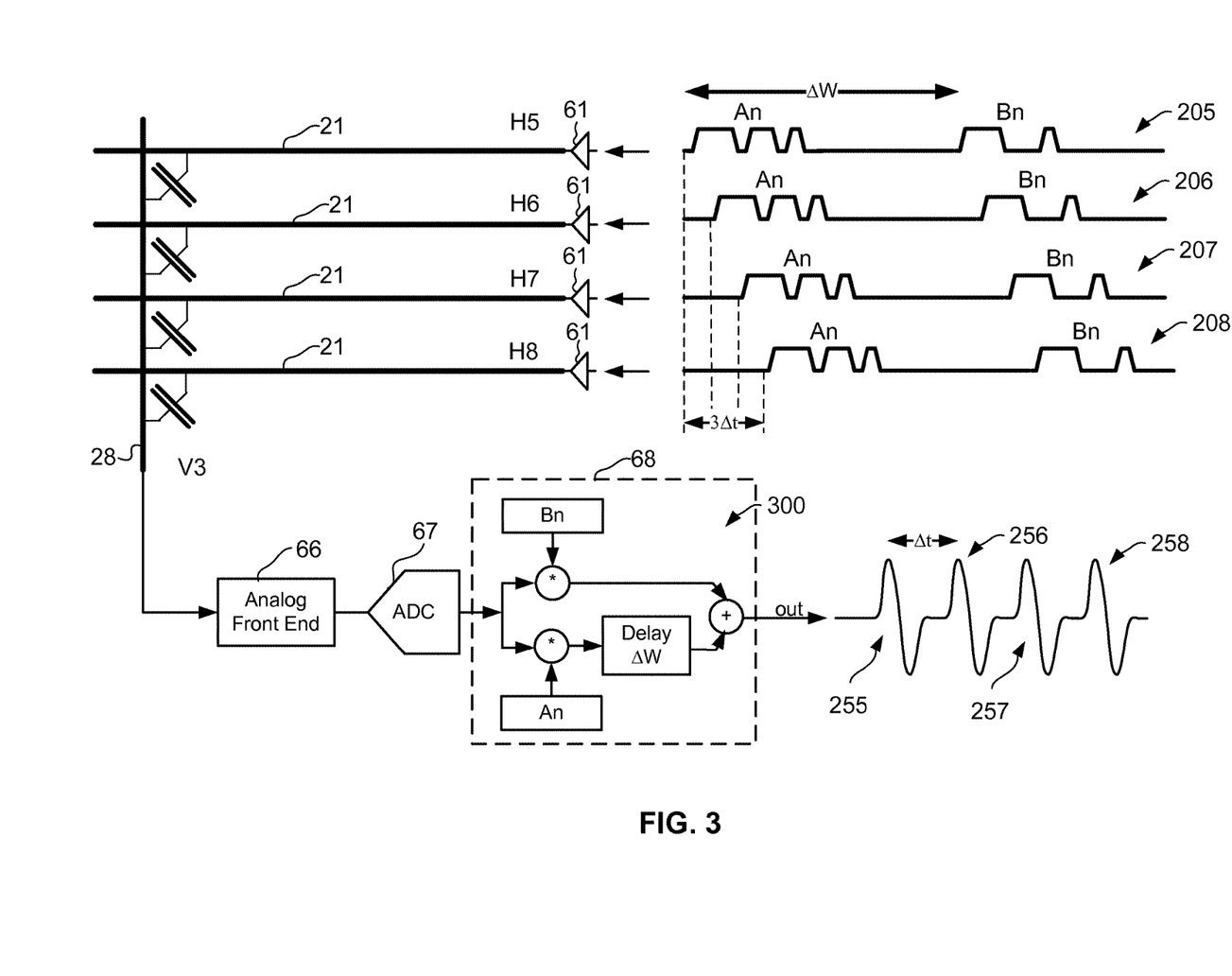
FIG. 3 is a simplified block diagram showing exemplary input to a plurality of driver lines of a digitizer sensor and corresponding output from one receiver line, in accordance with some embodiments of the present invention.

Reference is now made to FIG. 3 showing a simplified schematic representation of exemplary input to a plurality of driver lines of a digitizer sensor and corresponding output from one receiver line, in accordance with some embodiments of the present invention. According to some embodiments of the present invention, a plurality of driver lines, e.g. H5, H6, H7 and H8 are simultaneously triggered with input 205, 206, 207, and 208, respectively, each including first sequence $A_n$ followed by second sequence $B_n$. According to some embodiments of the present invention, the Golay pair of sequences, $A_n$ and $B_n$ is transmitted on each of the driver lines with different pre-defined delays so that corresponding response signals 255, 256, 257 and 258 obtained on the receiver end are separated in time and can be individually detected. In some exemplary embodiments, $A_n$ and $B_n$ are transmitted on each driver line with a delay of $\Delta t$. Typically, $\Delta t$ is defined to be longer than the duration of impulse response, e.g. longer than one of response signals 255, 256, 257 and 258. In some exemplary embodiments, AW is defined to be long enough so that sequence $A_n$ can be transmitted on each of the driver lines, e.g. H5-H9 prior to transmission of sequence $B_n$ on each of driver lines, H5-H9. According to some embodiments of the present invention, digital receiver logic 68 performs cross-correlation with sequence $A_n$ over a defined period in which sequences $A_n$ are transmitted and then performs cross-correlation with sequences $B_n$ over a subsequent period over which sequences $B_n$ are transmitted. At an end of a time frame over which both the $A_n$ sequences and the $B_n$ sequences are transmitted, cross-correlation with the sequences are added with an imposed delay on the cross-correlation with the $A_n$ sequence so that a single response is received for each Golay pair of sequences transmitted. For example, after summation of the $A_n$ sequences with the $B_n$ sequences, response 255 is obtained from input 205, response 256 is obtained from input 206, response 257 is obtained from input 207, and response 258 is obtained from input 208. Typically, a response to a particular input signal is recognized based on the order in which the response signals appear and/or based on a defined delay with respect to the input.

Figure 4A:
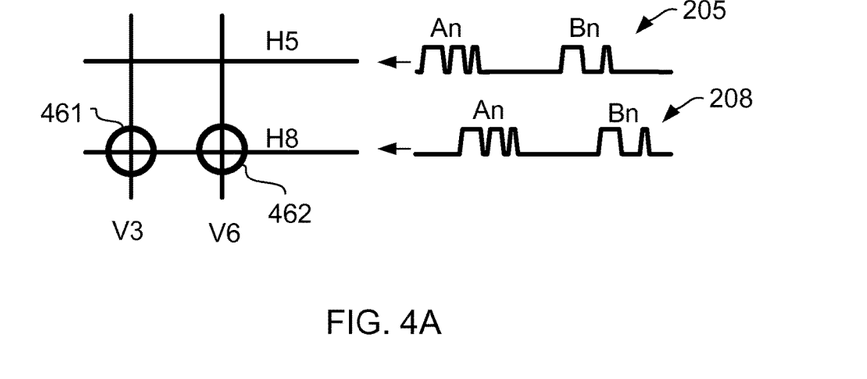
FIGS. 4A and 4B are a simplified schematic representation of exemplary finger touch input at two junctions of a digitizer sensor, and corresponding exemplary waveforms at output of a digital receiver, in accordance with some embodiments of the present invention.
Figure 4B:
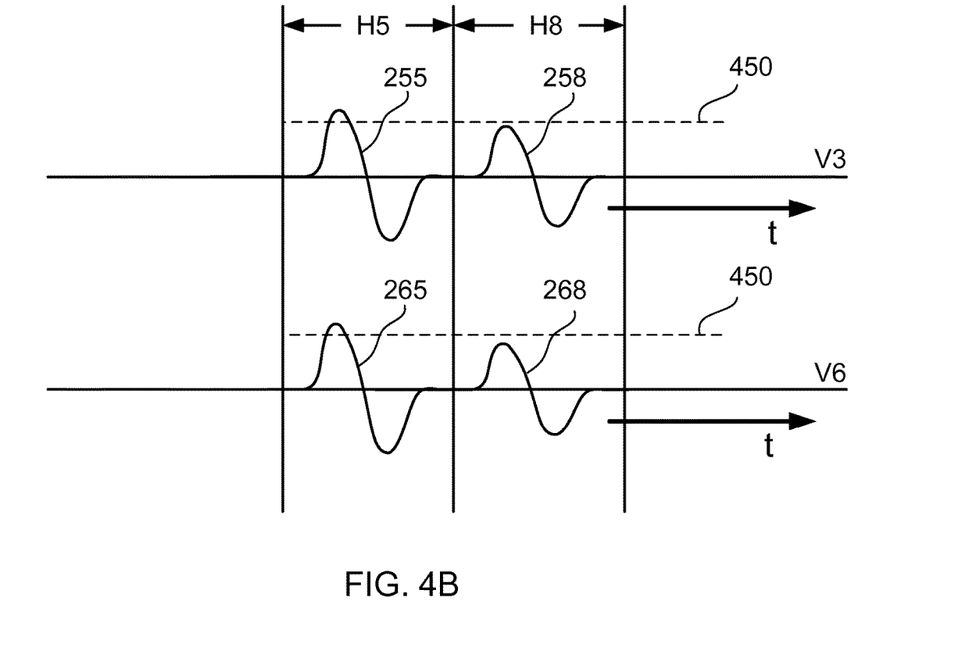

Reference is now made to FIGS. 4A and 4B showing a simplified schematic representation of exemplary finger touch input at two junctions of a digitizer sensor, and corresponding exemplary waveforms at an output of a digital receiver, in accordance with some embodiments of the present invention. According to some embodiments of the present invention, a presence of fingertip input at locations 461 and 462 is identified based on amplitude of responses to the Golay pair of sequences $A_n$ and $B_n$. For example, when driver lines H5 and H8 are triggered simultaneously with input 205 and 208, a first response signal 255 is obtained on receiver line V3 from a junction with driver line H5, and a subsequent second response signal 258 is obtained on receiver line V3 from a junction with driver line H8. Typically, a time delay between response signal 255 and response signal 258 corresponds to a time delay between sequence $A_n$ transmitted on H5 and $A_n$ transmitted on H8.

Likewise, a first response signal 265 is obtained on receiver line V6 from a junction with driver line H5, and a subsequent response signal 268 is obtained on receiver line V6 from a junction with driver line H8. Fingertip input at a junction between H8 and V3 is detected responsive to amplitude being below a base line level 450 in response 258, and fingertip input at junction between H8 and V6 is detected responsive to amplitude being below a base line level 450 in response 268.

Figure 5A:
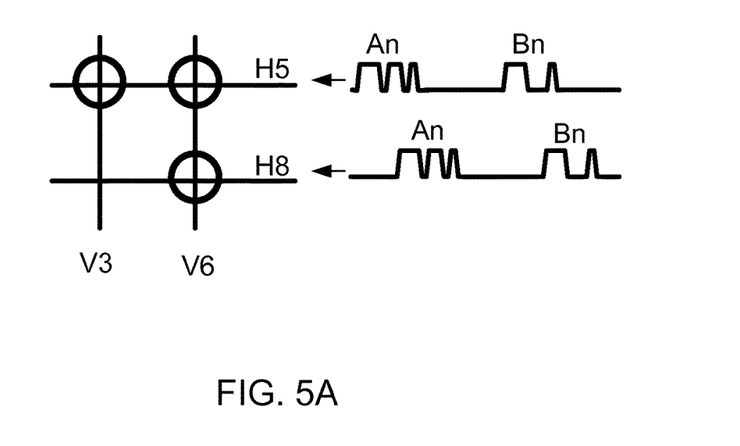
FIGS. 5A and 5B are a simplified schematic representation of an exemplary finger touch location at three junctions of a digitizer sensor, and corresponding exemplary waveforms at output of a digital receiver, in accordance with some embodiments of the present invention.
Figure 5B:
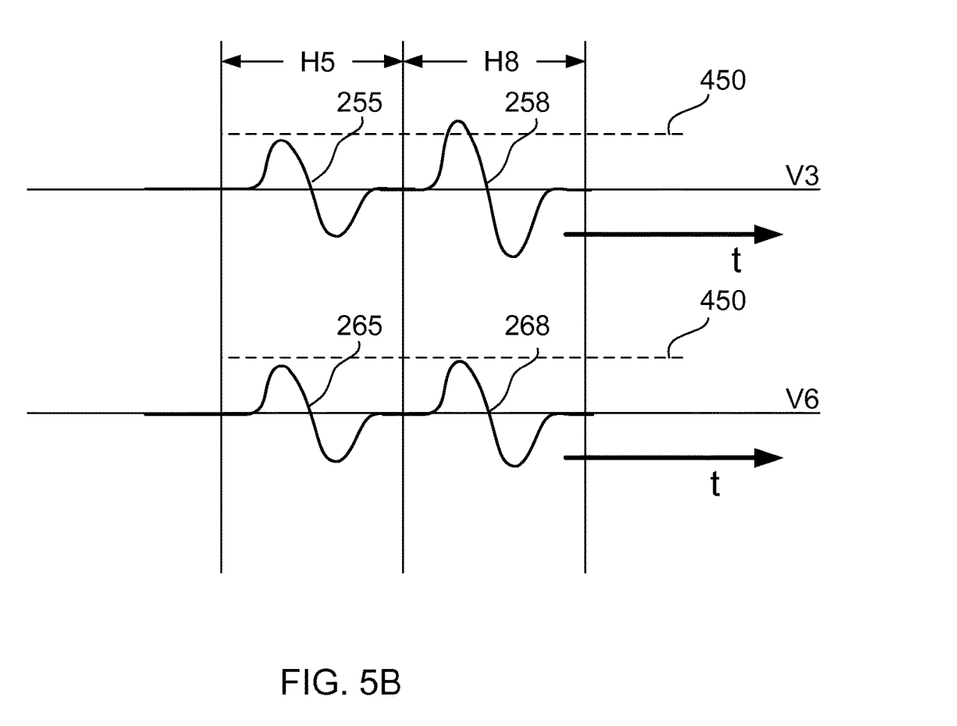

Reference is now made to FIGS. 5A and 5B showing a simplified schematic representation of an exemplary finger touch location at three junctions of a digitizer sensor and corresponding exemplary waveforms at output of a digital receiver, in accordance with some embodiments of the present invention. The example shown in FIGS. 5A and 5B is similar to that shown in FIGS. 4A and 4B but with simultaneous finger touch input at a junction between H5 and V3, between H5 and V6 and between H8 and V6. According to some embodiments of the present invention, corresponding responses 255, 265, and 268 show amplitude below base line level indicating a presence of fingertip input.

Figure 6A:
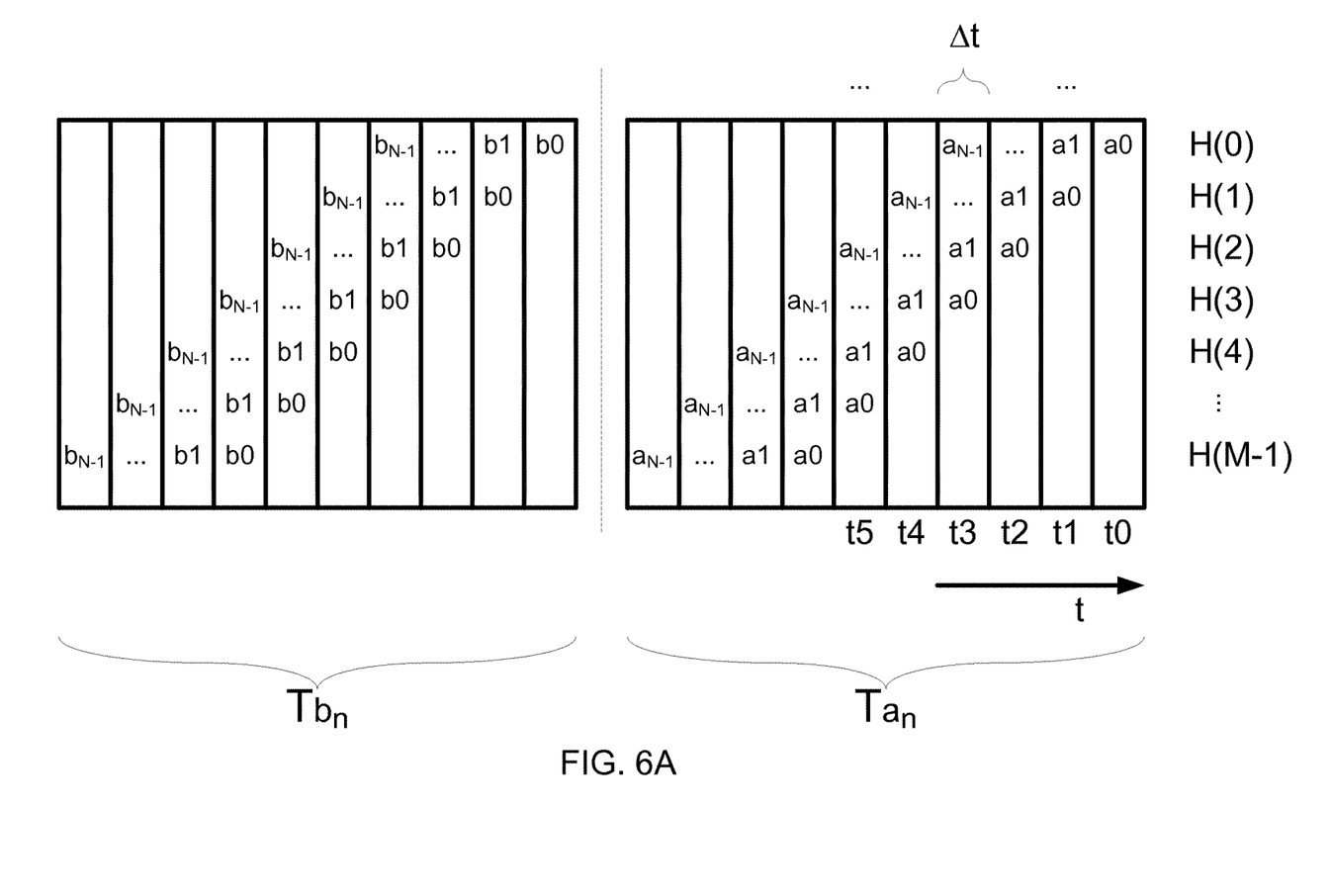
FIGS. 6A and 6B are a simplified schematic representation of an exemplary transmission a Golay pair of sequences on a plurality of driver lines when the sequences are modulated on a carrier signal, and a simplified block diagram for processing corresponding output received on a receiver line, in accordance with some embodiments of the present invention.
Figure 6B:
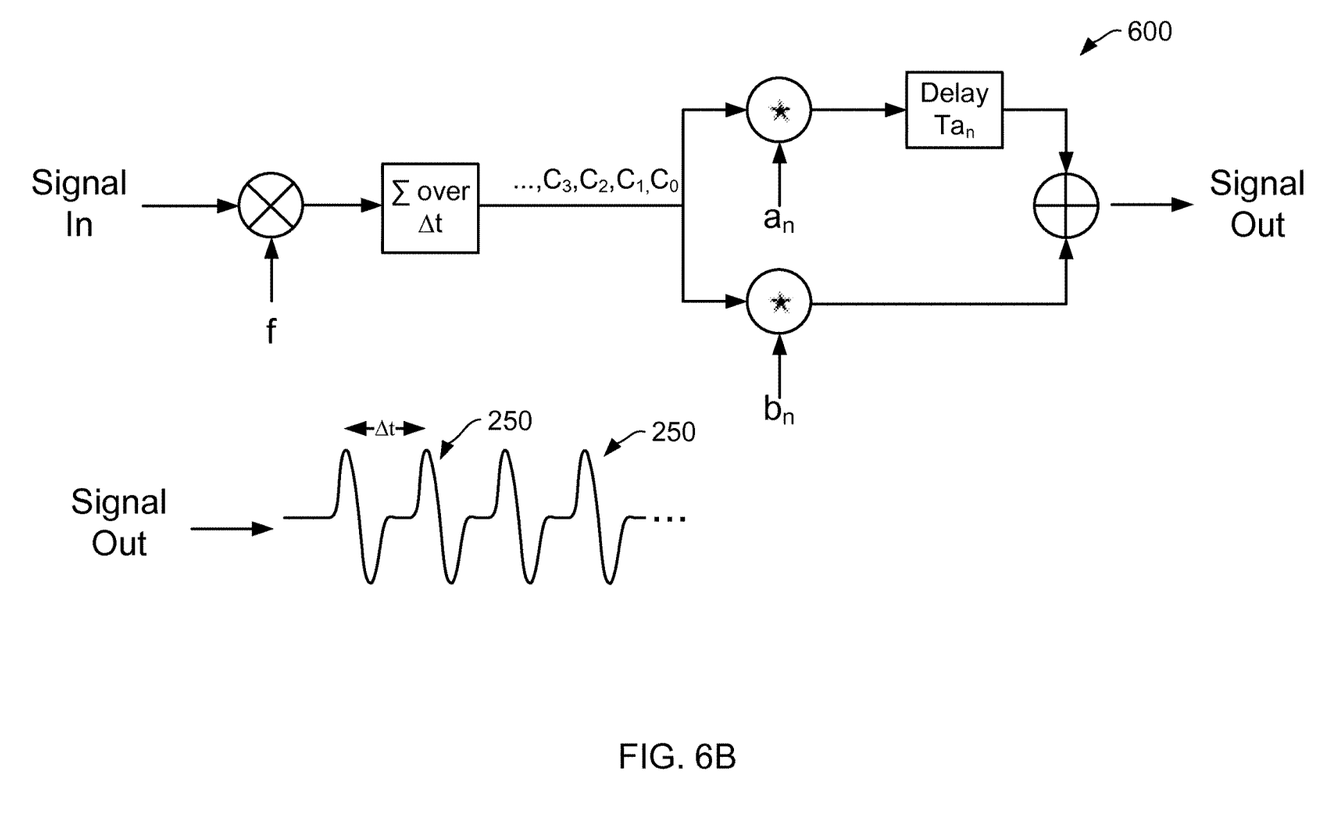

Reference is now made to FIGS. 6A and 6B showing a simplified schematic representation of an exemplary transmission of a Golay pair of sequences on a plurality of driver lines when the sequences are modulated on a carrier signal, and a simplified block diagram for processing corresponding output received on a receiver line, in accordance with some embodiments of the present invention. According to some embodiments of the present invention, coefficients of a Golay pair of sequences are modulated on a carrier signal with a defined frequency. In some exemplary embodiments, the digital coefficients of the sequences are represented with phase inversion, e.g. transmissions of the carrier signal with one of phase θ and phase θ+180.

According to some embodiments of the present invention, each coefficient of Golay sequence An, e.g. each of coefficients $a_0$ to $a_{n-1}$ is transmitted over a defined period $\Delta t$. According to some embodiments of the present invention, the time multiplexing is used to simultaneously trigger driver lines H0 to H(M-1) and coefficients of the Golay sequences are transmitted on each subsequent driver line with a delay that is an integer multiple of $\Delta t$. When using time domain multiplexing all elements of the $A_n$ sequence are transmitted on each of the lines prior to transmission of the $B_n$ sequence. For example, coefficient $b_0$ of sequence $B_n$ is transmitted on driver line H0 only after coefficient $a_{n-1}$ was transmitted on driver line H(M-1). $T_{an}$ represents a delay between an onset of each $A_n$ sequence and its corresponding $B_n$ sequence. Typically, $T_{an}$ is defined to be equal to or greater than $(N+M-1) \times \Delta t$. Typically, $T_{an}+T_{bn}$ represents the total frame length for transmitting of the Golay pair of sequence and is defined as $2 \times (N+M-1) \times \Delta t$ or greater.

According to some embodiments of the present invention, correlator 600 in digital receiver logic 68 receives output picked up by a receiver line and multiplies the output with the carrier frequency over periods of $\Delta t$ to demodulate the digital codes and obtain coefficients $C_0$ to $C_{2n}$ that make up sequences $A_n+B_n$. According to some embodiments of the present invention, coefficients $C_0$ to $C_{N-1}$ correspond to sequence $A_n$ and coefficients $C_n$ to $C_{2n-1}$ correspond to sequence $B_n$. Cross-correlation is performed an each of sequences $A_n$ and $B_n$ and the results are summed after matching the coefficients by applying a delay $T_{an}$. The output results in responses 250. Typically, a response 250 for each transmitted pair of Golay sequences as detected on a receiver line is obtained at the termination of frame length $T_{an}+T_{bn}$. According to some embodiments of the present invention, responses 250 obtained will be sequential from H0 to H(M-1) with delays and/or gaps of $\Delta t$ between.

Figure 7A:
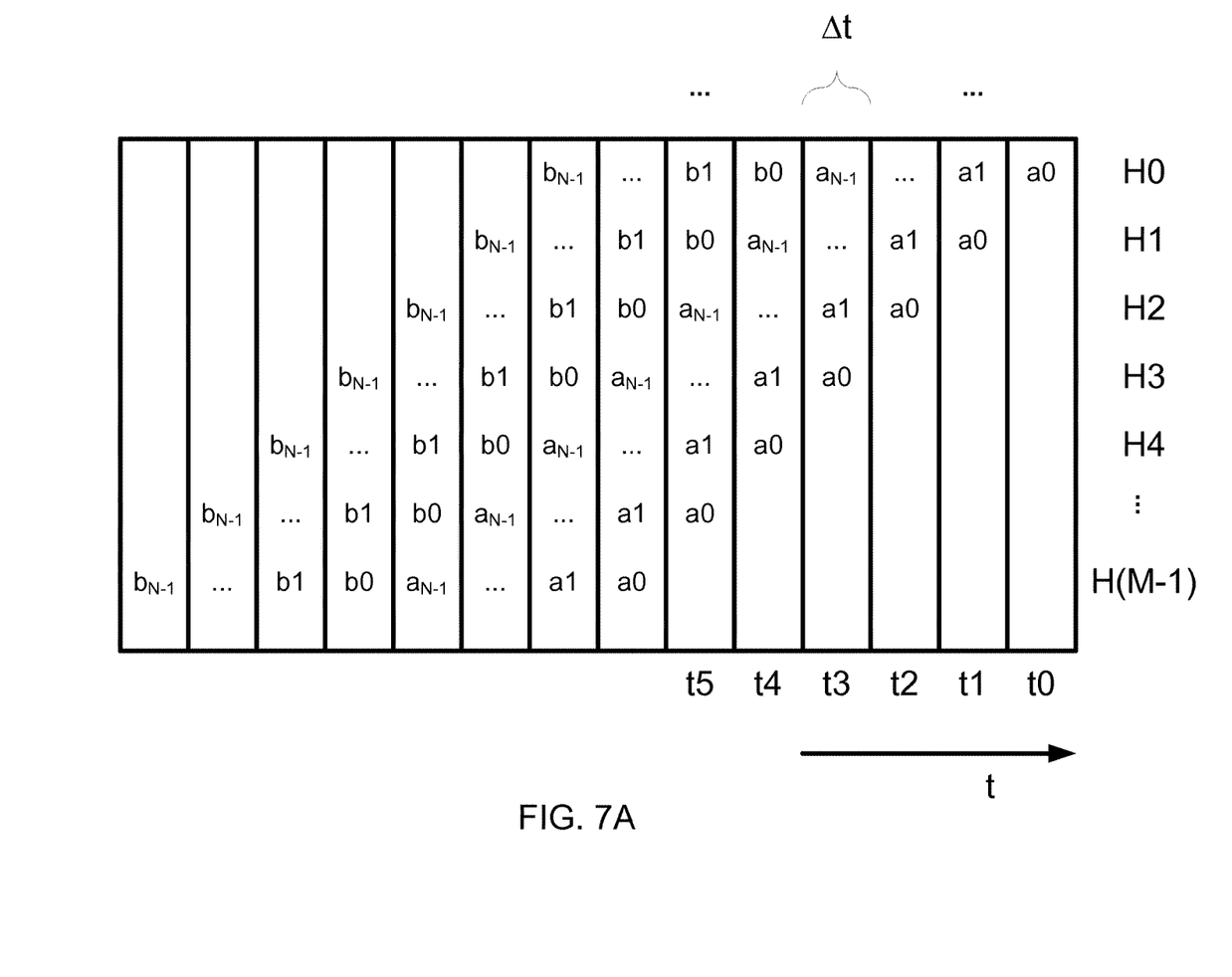
FIGS. 7A and 7B are a simplified schematic representation of another exemplary method for transmitting a Golay pair of sequences on a plurality of driver lines when the sequences are modulated on a carrier signal, and a simplified block diagram for processing corresponding output received on a receiver line in accordance with some embodiments of the present invention.
Figure 7B:
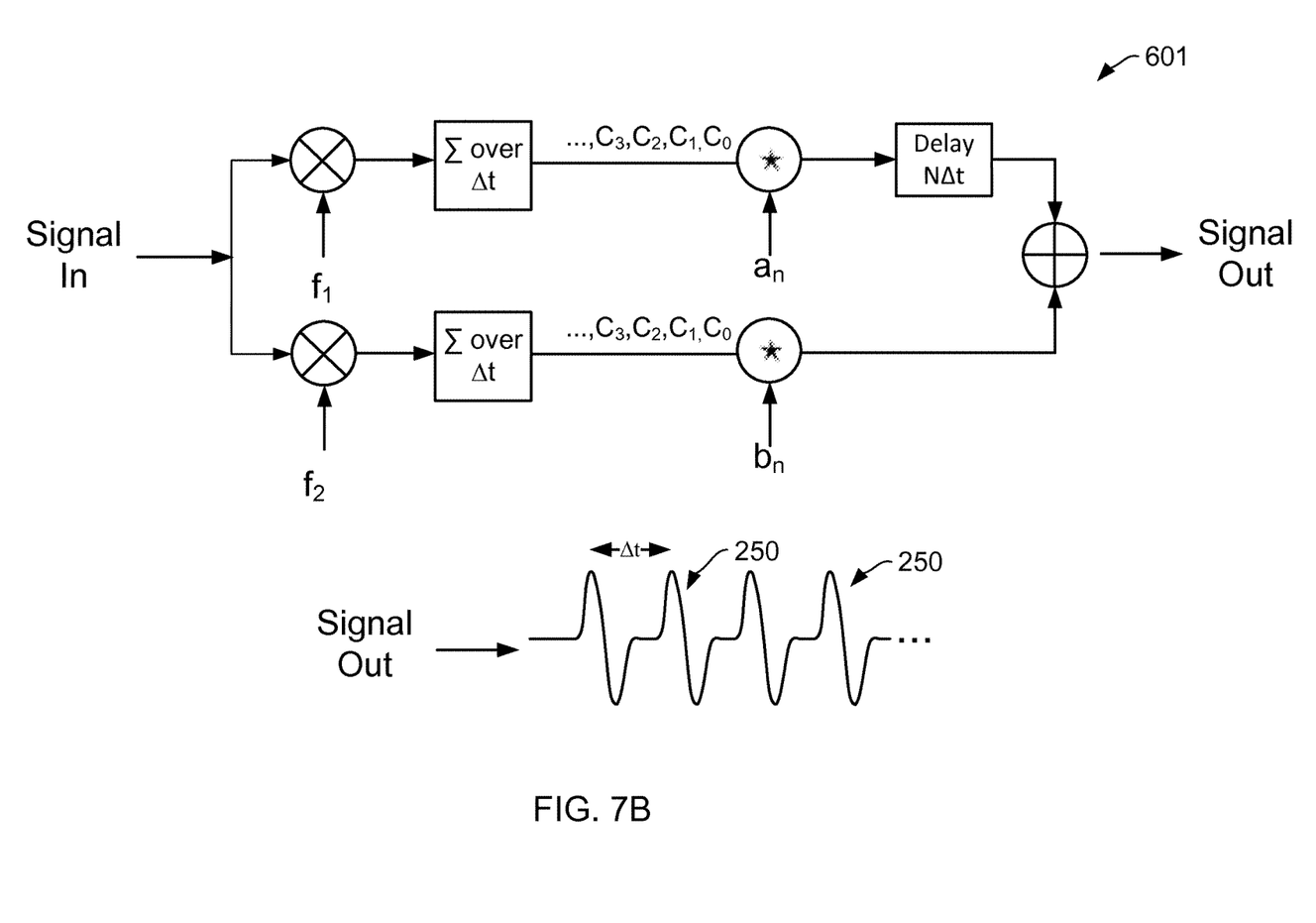

Reference is now made to FIGS. 7A and 7B showing a simplified schematic representation of another exemplary method for transmitting a Golay pair of sequences on a plurality of driver lines when the sequences are modulated on a carrier signal, and a simplified block diagram for processing corresponding output received on a receiver line, in accordance with some embodiments of the present invention. According to some embodiments of the present invention, a time frame for transmitting the Golay sequences can be shortened by frequency domain multiplexing. According to some embodiments of the present invention, sequence $A_n$ is modulated on a first carrier frequency and sequence $B_n$ is modulated on a second carrier frequency that is orthogonal to the first carrier frequency. Since the $A_n$ and $B_n$ sequences are carried on non-interfering frequencies, coefficients of the $B_n$ sequences can be transmitted concurrently with coefficients of the $A_n$ series on other driver lines. When operating with frequency domain multiplexing, the total frame length is defined as $(2N+M-1) \times \Delta t$. The present inventors have found that this method is advantageous over other known code division multiplexing techniques such as Walsh-Hadamard codes, since the sequence can be transmitted over a more concise time frame. Shortening the time frame for transmitting the sequence can potentially be used to increase the refresh rate of the digitizer system.

According to some embodiments of the present invention, correlator 601 in digital receiver logic 68 receives output from a receiver line and multiplies the output with carrier frequency $f_1$ over a periods of $\Delta t$ to demodulate the digital code and obtain coefficients $C_0$ to $C_{n-1}$ that make up sequences $A_n$ and also and multiplies the output with carrier frequency $f_2$ over a periods of $\Delta t$ to demodulate the digital code and obtain coefficients $C_n$ to $C_{2n-1}$ correspond to sequences $B_n$. Cross-correlation is performed with each of sequences $A_n$ and $B_n$ and the results are summed after matching the output by applying a delay $N\Delta t$. The output results in the responses 250 as also shown in FIG. 3.

It is noted that although most of the embodiments of the present invention have been described in reference to fingertip touch detection, the same method can also be applied for detecting other capacitive objects such as palms, hands or other body parts for interacting with a digitizer sensor.

It is also noted that although most of the embodiments of the present invention, describe transmitting a Golay sequence to driver lines in consecutive order with a defined delay, other patterns and/or orders for driving the driver lines can be used.

It is also noted that although most of the embodiments of the present invention, refer to the horizontal lines 21 as the driver lines and vertical lines 28 as the receiver lines for simplicity purposes, the invention is not limited in this respect. Alternatively, vertical lines 28 can operate as the driver lines and horizontal lines 21 can operate as the receiver lines.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

What is claimed is:

1. A method for multi-touch detection on a grid based capacitive sensor, the method comprising:
   transmitting consecutively a first and then a second sequence of a Golay pair of sequences on a first driver line of a grid based capacitive sensor;
   transmitting the first and then the second sequence of a Golay pair of sequences on a second driver line, at a predefined delay with respect to transmission on the first driver line;
   sampling output on a receiver line of the grid based capacitive sensor;
   separating output originating from the first driver line with output originating from the second driver line; and
   detecting presence of an input object responsive to the output as separated.

2. The method of claim 1, wherein the Golay pair of sequences is a pair of bipolar sequences.

3. The method of claim 1, wherein the Golay pair of sequences transmitted on each of the first and second drive lines are encoded on a carrier signal.

4. The method of claim 3, wherein the Golay pair of sequences is encoded as a sequence of phase inversions of the carrier signal.

5. The method of claim 1, wherein the first sequence transmitted on the first driver line is encoded on a first carrier signal and wherein the second sequence transmitted on the second driver line is encoded on a second carrier signal that is orthogonal to the first carrier signal.

6. The method of claim 5, wherein the first and second carrier signals are orthogonal in frequency.

7. The method of claim 1, comprising using frequency domain multiplexing for transmitting the second sequence on the first driver line concurrently with transmitting the first sequence on the second driver line.

8. The method of claim 1, comprising transmitting consecutively the first and then the second sequence of the Golay pair of sequences on a third driver line of the grid based capacitive sensor and in phase with transmission on the first driver line, wherein the Golay pair of sequences transmitted on the first driver line is encoded on a first carrier signal and wherein the Golay pair of sequences transmitted on the third driver line is encoded on a second carrier signal that is orthogonal to the first carrier signal.

9. The method of claim 1, wherein the predefined delay is shorter than a transmission period for transmitting the first sequence on the first driver line.

10. The method of claim 1, wherein the output originating from the first driver line is separated with output originating from the second driver line using a single correlator.

11. The method of claim 1, comprising cross correlating the output on the receiver line with each of the first and second sequences of the Golay pair of sequences and summing results of the cross correlation with the first sequence with results of the cross correlation of the second sequence.

12. Circuitry for performing multi-touch detection on a grid based capacitive sensor comprising:
    drive circuitry configured to transmit a Golay pair of sequences on a first and second driver lines of a grid based capacitive sensor, wherein the Golay pair of sequences transmitted on the second driver line is transmitted with a predefined delay with respect to transmission on the first driver line; and
    receiver circuitry configured to sample output on a receiver line of the grid based capacitive sensor, separate output originating from the first driver line from output originating from the second driver line and detect presence of an input object responsive to the output as separated.

13. Circuitry according to claim 12, wherein the predefined delay is shorter than duration for transmitting one sequence of the Golay pair of sequences.

14. The method according to claim 1, wherein the predefined delay is an integer multiple of a period over which one coefficient of a sequence of the Golay pair is transmitted.

15. The method according to claim 1, wherein the predefined delay is a period over which one coefficient of a sequence of the Golay pair is transmitted.

16. The circuit according to claim 12, wherein the predefined delay is an integer multiple of a period over which one coefficient of a sequence of the Golay pair is transmitted.

17. The circuit according to claim 12, wherein the predefined delay is a period over which one coefficient of a sequence of the Golay pair is transmitted.

* * * * *